United States Patent
Yuan

(10) Patent No.: US 7,595,943 B2
(45) Date of Patent: Sep. 29, 2009

(54) CAMERA MODULE

(75) Inventor: Kun-I Yuan, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/967,090

(22) Filed: Dec. 29, 2007

(65) Prior Publication Data

US 2008/0278833 A1  Nov. 13, 2008

(30) Foreign Application Priority Data

May 8, 2007  (CN) .......................... 2007 1 0200589

(51) Int. Cl.
G02B 7/02 (2006.01)

(52) U.S. Cl. .................................................. 359/820

(58) Field of Classification Search ......... 359/819–823; 348/294

See application file for complete search history.

(56) References Cited

U.S. PATENT DOCUMENTS 4,601,452 A * 7/1986 Rando ..................... 248/187.1
6,188,526 B1 * 2/2001 Sasaya et al. ............... 359/666
6,967,785 B2   11/2005 Makii et al.
2007/0070228 A1 * 3/2007 Lee ............................. 348/294
2007/0146908 A1 * 6/2007 Li ............................... 359/820

FOREIGN PATENT DOCUMENTS

JP          402126209   *  5/1990

* cited by examiner

*Primary Examiner*—Ricky L Mack
*Assistant Examiner*—Vipin M Patel
(74) *Attorney, Agent, or Firm*—Clifford O. Chi

(57) ABSTRACT

A camera module includes a lens assembly, a lens barrel, an image sensor, a hollow holder receiving the lens barrel and the image sensor, and a thermally deformable member. The lens assembly defines a first focal length with a first focus point at a first temperature and a second focal length with a second focus point at a second temperature on an optical axis associated therewith. The thermally deformable member has one end attached to the lens barrel and an opposite end attached to the holder. The thermally deformable member comprises a first sheet and a second sheet. Wherein at the second temperature, the second sheet bends toward the first sheet thereby moving the second focus point toward the first focus point and the image plane of the lens assembly with the second focal length toward the image sensor.

9 Claims, 4 Drawing Sheets

CAMERA MODULE

BACKGROUND

1. Technical Field

The present invention relates to camera modules, and particularly, to a camera modules used in a wide temperature range.

2. Description of Related Art

With the rapid development of electronics technology, camera modules, which typically includes a lens assembly and an image sensor, have been applied in places such as workshops, vehicles, or in electronic devices such as personal computers. In these places or electronic devices, a normal temperature to a work temperature (usually higher than the normal temperature) may be in a wide temperature range. Such camera modules are required to have excellent imaging performance in a wide temperature range.

Actually, the temperature change, i.e. the temperature difference may lead to a change of a focal length of the lens assembly, for example, a focal length at the work temperature may differ from a focal length at a normal temperature. Accordingly, an image plane of the lens assembly may change. The image sensor may not detect an image at the work temperature as clear as an image at the normal temperature. In this way, movement of the lens assembly is needed for compensating the focal length change. However, actuators such as step motors are quite bulky for the above places or electronic devices. In addition, the step motor consumes a substantial amount of power, especially relative to the amount of power that can be stored in a typical battery that powers the camera module.

What is needed, therefore, is a camera module having a simple and energy-efficient mechanism to move the lens assembly when a temperature difference exists.

SUMMARY

In an embodiment, an exemplary camera module includes a lens assembly, a lens barrel receiving the lens assembly therein, a hollow holder, an image sensor and a thermally deformable member. The lens assembly defines an optical axis. The lens assembly has a first focal length with a first focus point thereof located at a first location at a first temperature on the optical axis, and a second focal length with a second focus point thereof located at a second location at a second temperature on the optical axis. The second temperature is greater than the first temperature. The hollow holder receives the lens barrel therein. The image sensor is arranged within the holder and disposed at an image plane of the lens assembly with the first focal length. The thermally deformable member has a first end attached to the lens barrel and an opposite second end attached to the holder. The thermally deformable member has a first sheet and a second sheet opposite to the first sheet. The thermally deformable member is deformable into a first configuration at the first temperature and a second configuration at the second temperature. Wherein with the temperature increasing from the first temperature to the second temperature, the thermally deformable member is progressively deformed in a such manner that the lens barrel with the lens assembly is driven along the optical axis of the lens assembly, in order to move the second focus point from the second location towards the first location and an image plane of the lens assembly with the second focal length towards the image sensor.

Other novel features and advantages will become more apparent from the following detailed description of preferred and exemplary embodiments when taken in conjunction with the accompanying drawings.

BRIEF DESCRIPTION OF THE DRAWINGS

Many aspects of the present camera module can be better understood with reference to the following drawings. The components in the drawings are not necessarily drawn to scale, the emphasis instead being placed upon clearly illustrating the principles of the present camera module. Moreover, in the drawings, like reference numerals designate corresponding parts throughout the several views.

DETAILED DESCRIPTION OF THE PREFERRED EMBODIMENTS

Embodiments of the present camera module will now be described in detail below and with reference to the drawings.

Figure 1:
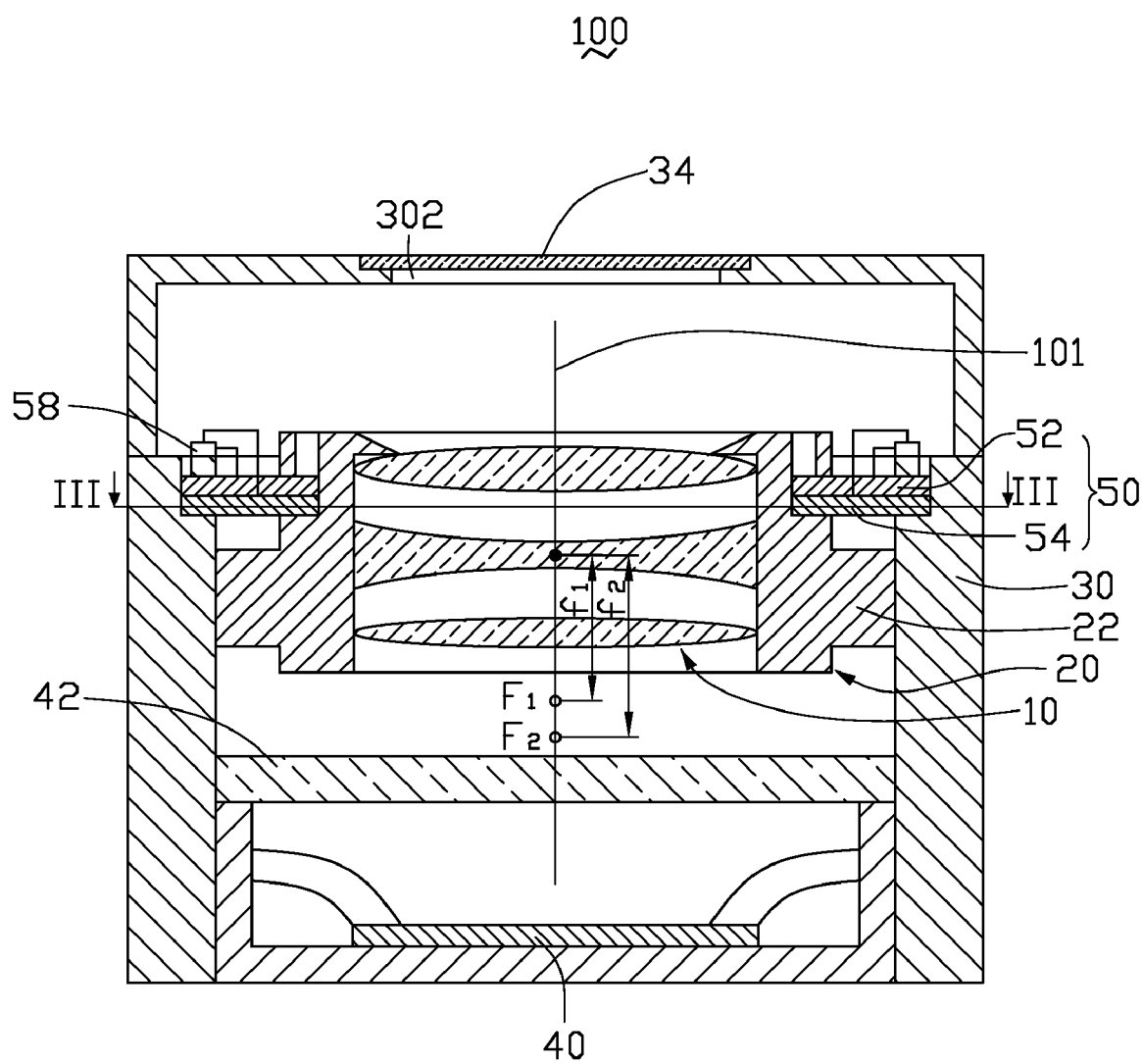
FIG. 1 is a schematic view of a camera module at a first temperature according to a first embodiment of the present invention.
Figure 2:
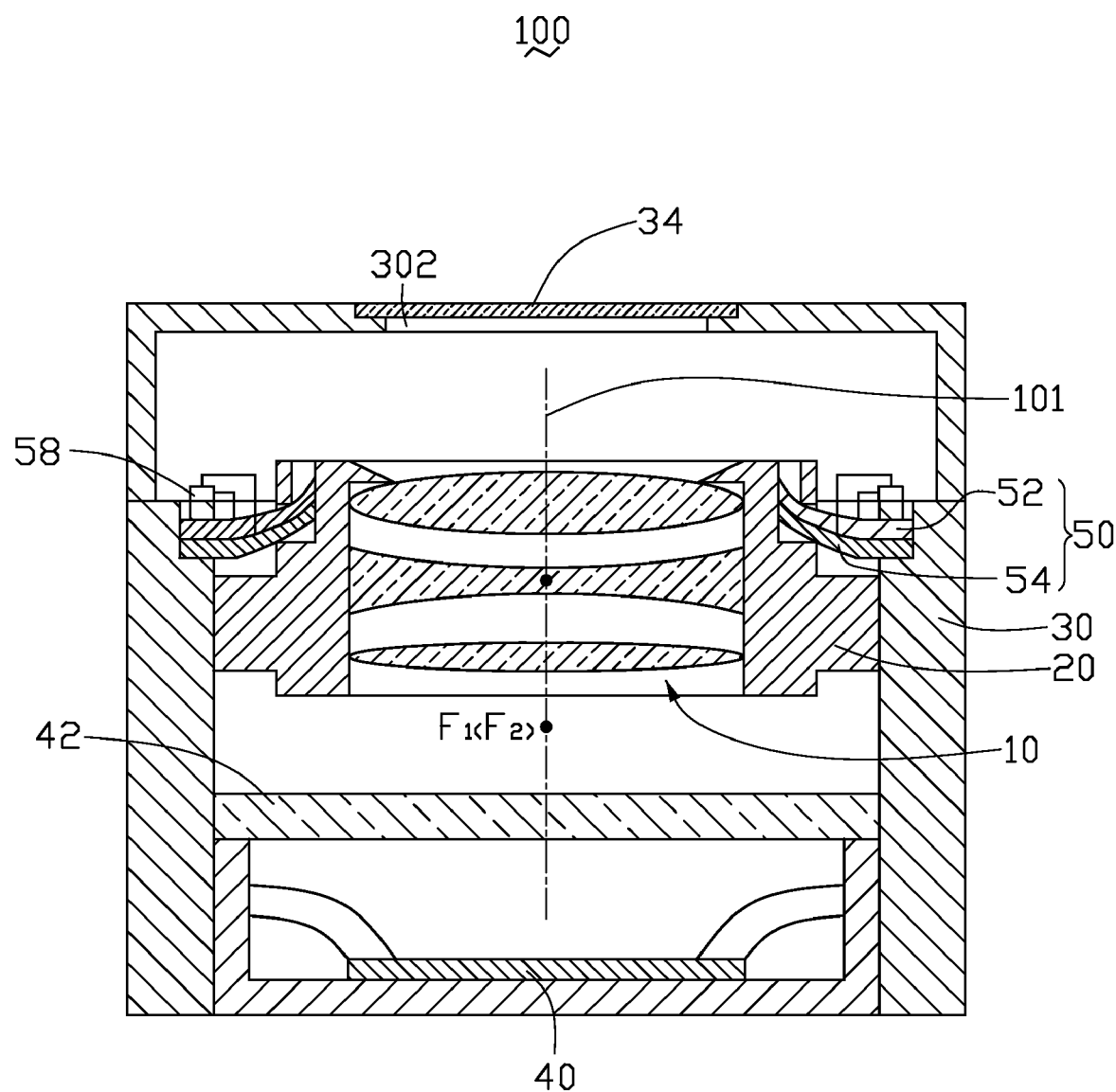
FIG. 2 is a schematic view of a camera module at a second temperature according to a first embodiment of the present invention.
Figure 3:
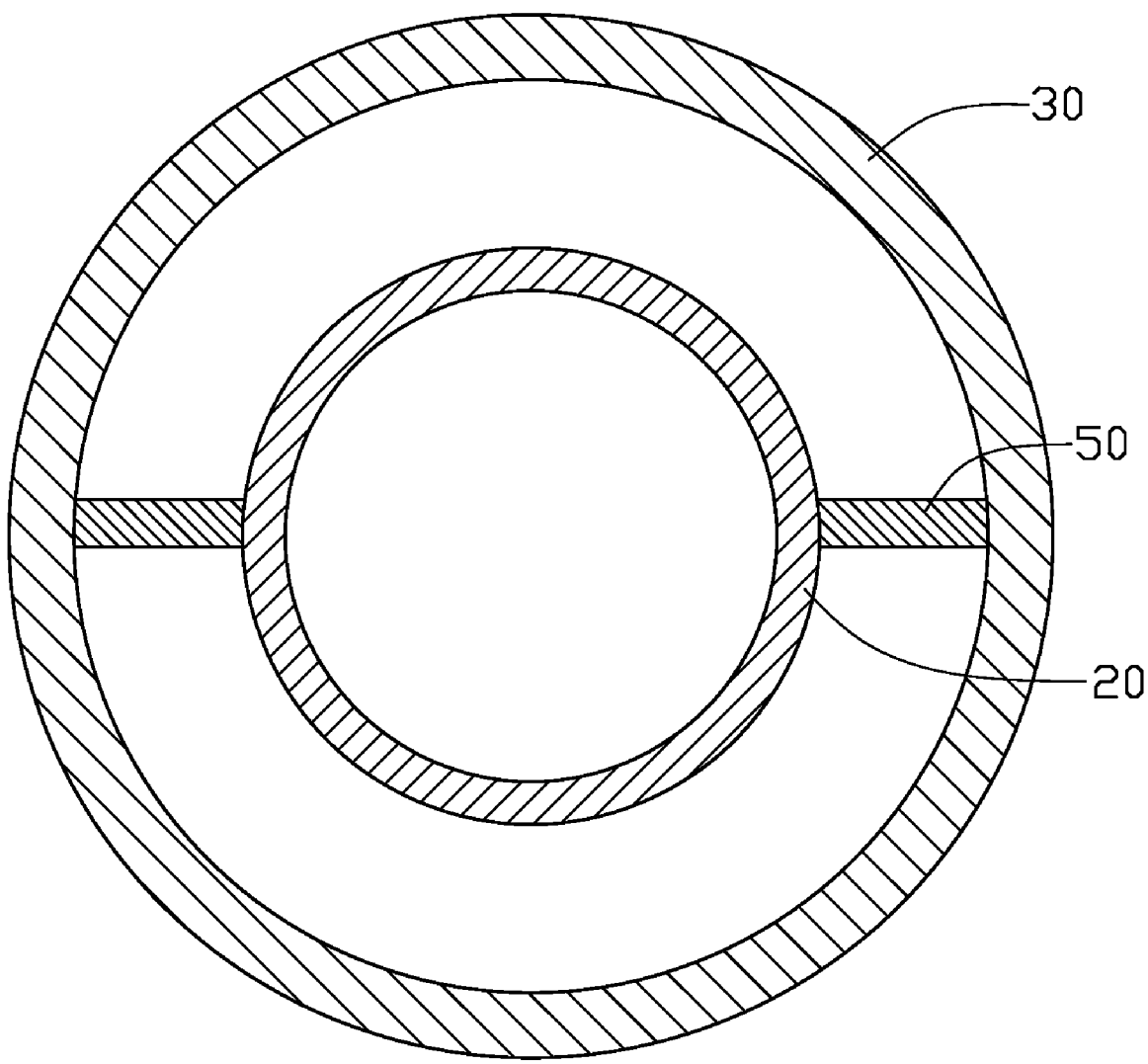
FIG. 3 is a cross-sectional view taken along line III-III of the camera module shown in FIG. 1.

Referring to FIGS. 1 to 3, an exemplary camera module 100 according to a first embodiment, includes a lens assembly 10, a lens barrel 20, a hollow holder 30, an image sensor 40, and two spaced thermally deformable members 50 arranged at a radial outer side of a peripheral side wall of the lens barrel 20. The lens assembly 10 is received in the lens barrel 20. The lens barrel 20 and the image sensor 40 are received in the holder 30. Each of the thermally deformable members 50 has one end attached to the radial outer side of the peripheral side wall of the lens barrel 20 and an opposite end attached to the holder 30. In the illustrated embodiment, the two thermally deformable members 50 are at diametrically opposite sides of the peripheral side wall of the lens barrel 20.

The holder 30 has a light incident opening 302 at an end thereof. A filter 34 is defined in the light incident opening 302. The lens barrel 20 has two protrusions 22 thereon. The protrusions 22 contact an inner wall of the holder 30, and can be moved along the inner wall of the holder 30.

The lens assembly 10 includes three lenses. Each of the lenses is typically made of plastic or glass, and can be in a spherical or aspherical shape. The lens assembly 10 defines an optical axis 101. The lens assembly 10 has a first focal length $f_1$ with a first focus point at a first temperature. The first focus point is located at a first location $F_1$ on the optical axis 101. However, when a temperature difference exists, for example, at a second temperature, which is higher than the first temperature, the first focal length $f_1$ with a first focus point may change into a second focal length $f_2$ with a second focus point. The second focus point is located at a second location $F_2$ on the optical axis 101. The second location $F_2$ is closer to the image sensor 40 than the first location $F_1$.

The image sensor 40 may be a CCD sensor or a CMOS sensor. A glass cover 42 is defined above the image sensor 40, in order to prevent the image sensor 40 from being contaminated by pollution such as dust, etc. The image sensor 40 is disposed at an image plane of the lens assembly 10 with the first focal length $f_1$. However, at the second temperature, an image plane of the lens assembly 10 with the second focal length $f_2$ may be out of the image sensor 40.

Each of the thermally deformable members 50 has a first sheet 52 and a second sheet 54. The first sheet 52 and the second sheet 54 are in a same size and are attached to each other. The first sheet 52 is disposed at an object side of the lens assembly 10, the second sheet 54 is disposed at an image side of the lens assembly 10. The first sheet 52 and the second sheet 54 are made from two different metals with two different thermal expansion coefficients. A thermal expansion coefficient of the second sheet 54 is larger than that of the first sheet 52. The second sheet 54 is deformable under the temperature variations on the lens assembly 10. With the temperature increasing from the first temperature to the second temperature, the second sheet 54 progressively bends toward the first sheet 52, i.e., deforms from a first configuration as shown in FIG. 1 to a second configuration as shown in FIG. 2, the lens barrel 20 is thus driven along the optical axis 101. In this way, the second focus point is moved from the second location $F_2$ towards the first location $F_1$, and an image plane of the lens assembly 10 with the second focal length f2 is moved back to the image sensor 40. As a result, the image sensor 40 can detect an image at the second temperature as clear as an image at the first temperature.

The thermally deformable members 50 each are preferably connected to a strain sensor 58, such that a deformation of each of the thermally deformable members 50 can be detected in a timely matter.

Figure 4:
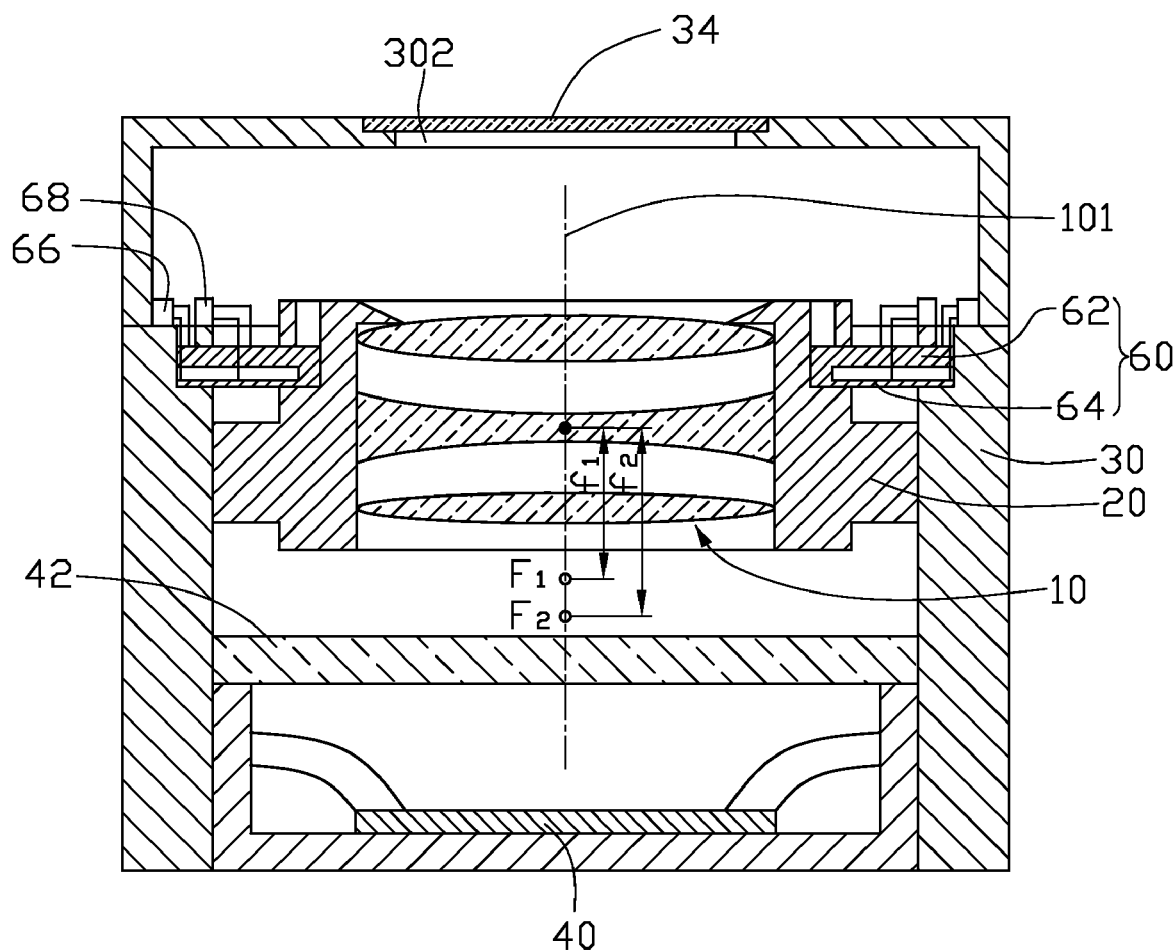
FIG. 4 is a schematic view of a camera module at a first temperature according to a second embodiment of the present invention.

Referring to FIG. 4, an exemplary camera module 200 according to a second embodiment is shown. The camera module 200 is essentially similar to the camera module 100 illustrated above, however, thermally deformable members 60 are differ from the thermally deformable members 50. Each of the thermally deformable members 60 includes a first sheet 62 and a second sheet 64. The second sheet 64 is thinner than the first sheet 62, one ends of the first sheet 62 and the second sheet 64 are connected to each other and attached to the lens barrel 20, the opposite ends of the first sheet 62 and the second sheet 64 are attached to the holder 30. The first sheet 62 and the second sheet 64 each are made from a poly-silicon, and are connected to a power supply 66. When the thermally deformable members 60 do not deform enough to the second configuration as shown in FIG. 2 under the temperature variations on the lens assembly 10, the power supplies 66 can provide the thermally deformable members 60 heat compensations. The second sheet 64 is thinner than the first sheet 62, such that heat accumulated in the second sheet 64 is more than that of the first sheet 62, the second sheet 64 thus is able to bend toward the first sheet 62. The thermally deformable members 60 each can also be connected to a strain sensor 68.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A camera module, comprising:
a lens assembly having a first focal length with a first focus point thereof located at a first location at a first temperature and a second focal length with a second focus point thereof located at a second location at a second temperature on an optical axis associated therewith, the second temperature being greater than the first temperature;
a lens barrel receiving the lens assembly therein;
a hollow holder receiving the lens barrel therein;
an image sensor arranged within the holder and disposed at an image plane of the lens assembly with the first focal length; and
a thermally deformable member arranged at a radial outer side of a peripheral side wall of the lens barrel, the thermally deformable member comprising a first sheet and a second sheet opposite to tbe first sheet, the second sheet being thinner than the first sheet, first ends of the first and second sheets being connected to each other and attached to the radial outer side of the peripheral side wall of the lens barrel, and opposite second ends of the first and second sheets each being attached to the holder, the first and second sheets being spaced from each other except where they are connected to each other at the first ends thereof, the thermally deformable member being deformable into a first configuration at the first temperature and a second configuration at the second temperature, wherein the thermally deformable member is progressively deformed in a manner such that the lens barrel together with the lens assembly is driven along the optical axis of the lens assembly to move the second focus point from the second location toward the first location and an image plane of the lens assembly with the second focal length toward the image sensor with the temperature increasing from the first temperature to the second temperature.

2. The camera module-as described in claim 1, wherein the thermally deformable member is connected to a strain sensor.

3. The camera module as described in claim 1, wherein the second sheet faces toward the image sensor.

4. The camera module as described in claim 1, wherein the first and second sheets each are made from a poly-silicon.

5. The camera module as described in claim 1, wherein the thermally deformable member is a single body of material comprised of the first and second sheets.

6. The camera module as described in claim 1, wherein the lens barrel has a protrusion thereon, and the protrusion of the lens barrel contacts and is moved along an inner wall of the holder when the lens barrel together with the lens assembly is driven along the optical axis of the lens assembly.

7. The camera module as described in claim 1, wherein the first sheet and the second sheet deform along a same direction.

8. The camera module as described in claim 7, wherein the second sheet is capable of bending toward the first sheet when the first sheet and the second sheet deform.

9. The camera module as described in claim 1, wherein the first and second sheets each are connected to a power supply.

* * * * *